United States Patent [19]

Lutts

[11] 4,033,074
[45] July 5, 1977

[54] PORTABLE RAIL SAW

[75] Inventor: William M. Lutts, Nashville, Tenn.

[73] Assignee: Safetran Systems Corporation, Louisville, Ky.

[22] Filed: Oct. 28, 1975

[21] Appl. No.: 626,359

[52] U.S. Cl. .................................................. 51/178
[51] Int. Cl.² ........................................ B24B 23/00
[58] Field of Search ............ 51/178, 241 LG, 241 S

[56] References Cited

UNITED STATES PATENTS

| | | | |
|---|---|---|---|
| 1,973,429 | 9/1934 | Looney | 51/178 |
| 2,214,141 | 9/1940 | Mall | 51/178 X |
| 2,257,480 | 9/1941 | Perazzoli | 51/178 |
| 2,404,604 | 7/1946 | Taylor | 51/241 S |
| 2,801,506 | 8/1957 | Mills | 51/241 S |
| 3,046,707 | 7/1962 | Obear | 51/178 |
| 3,974,596 | 8/1976 | Huboud-Peron | 51/178 |

Primary Examiner—James L. Jones, Jr.
Attorney, Agent, or Firm—Kinzer, Plyer, Dorn & McEachran

[57] ABSTRACT

A hand carried portable rail saw assembly includes a saw having a rotatable blade, a clamp adapted to attach to a rail to be cut and an axial locater adjustably mounted on the clamp and supporting the saw. The saw is pivotally attached to the axial locater and is arranged for pivotal movement from one side of the rail to the other so that first one side of the rail is cut and then the opposite side is cut. A hardened saw guide is attached to the clamp and the saw blade is positioned directly adjacent the guide during the cutting operation.

6 Claims, 4 Drawing Figures

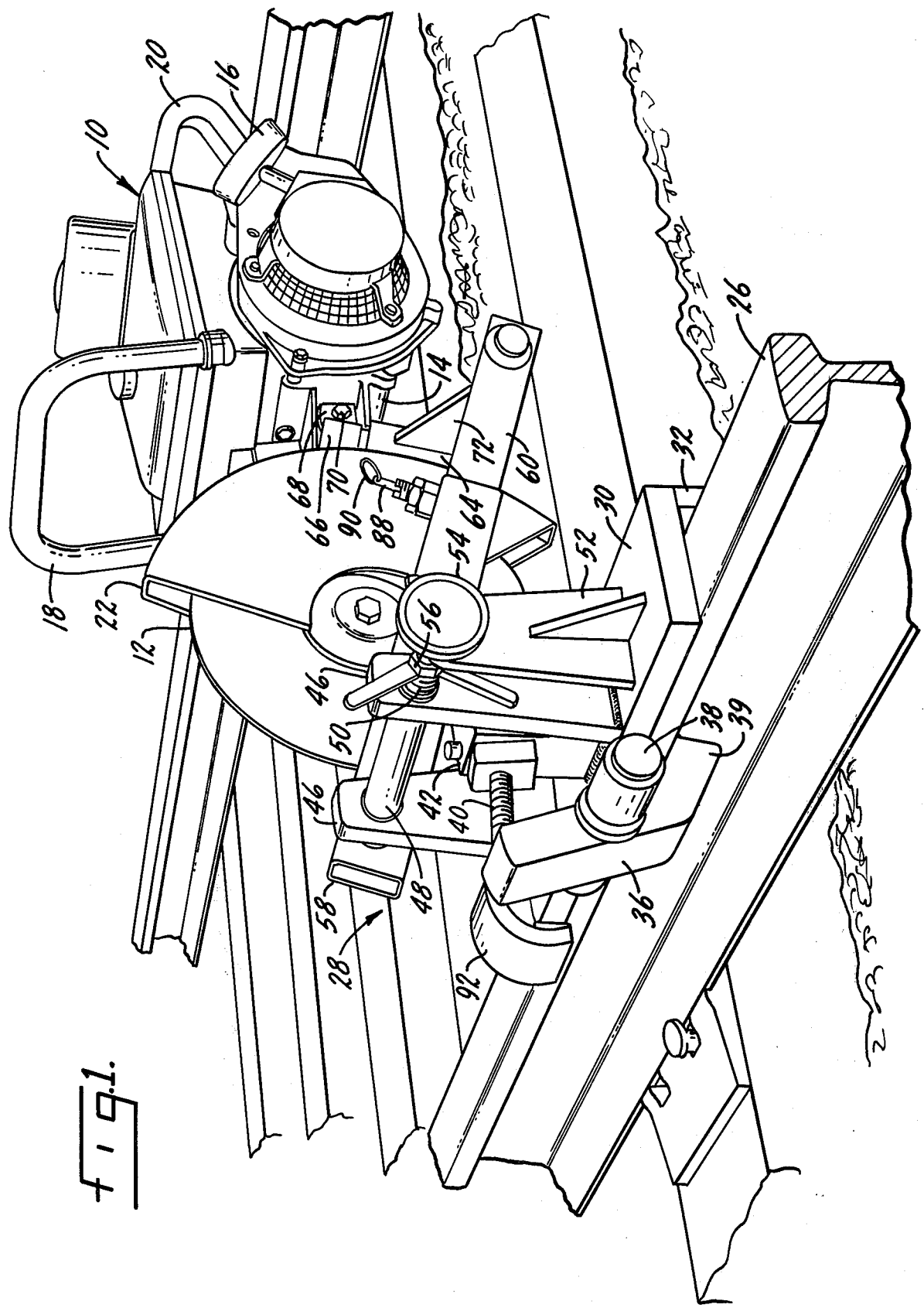

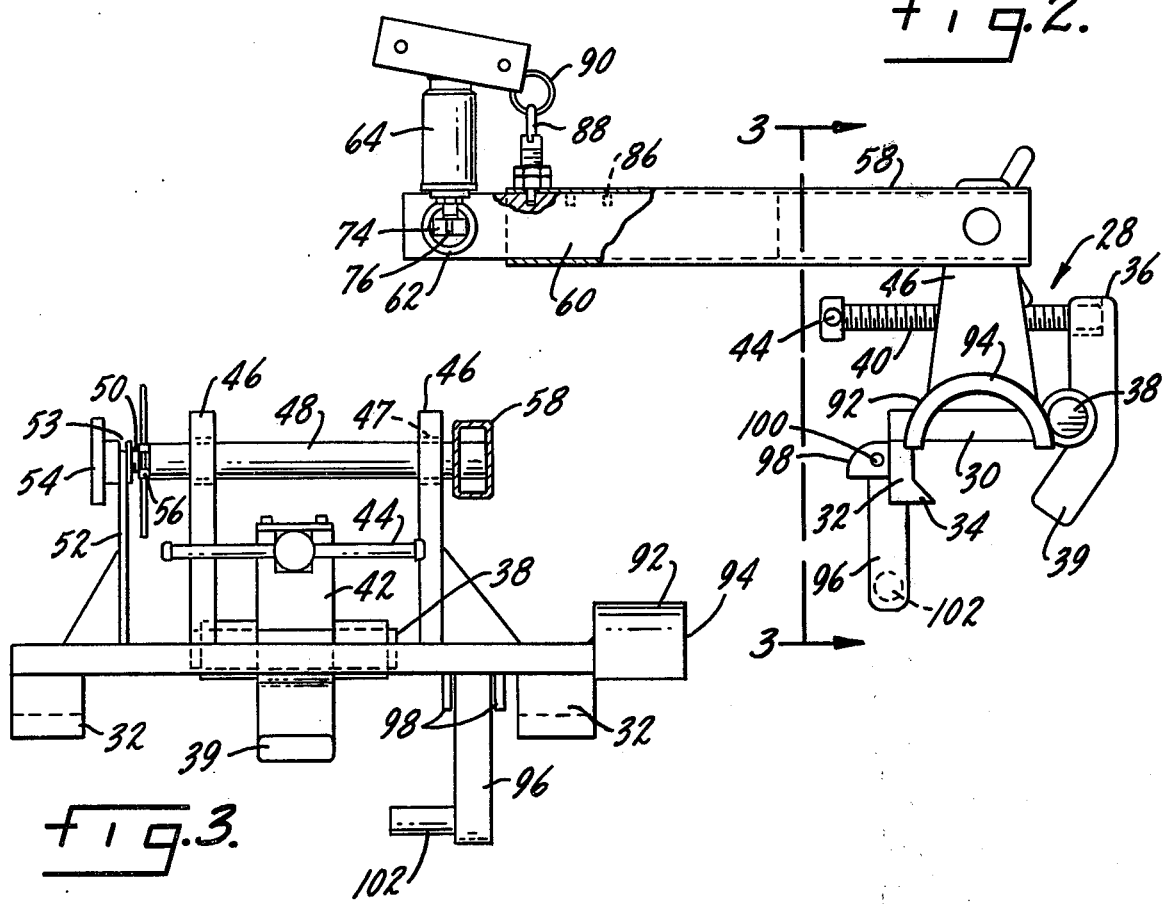
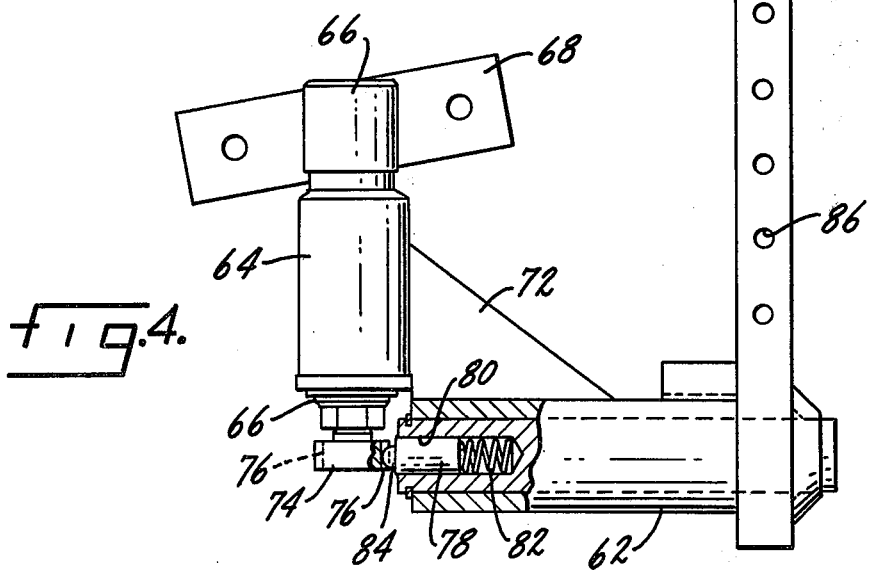

PORTABLE RAIL SAW

SUMMARY OF THE INVENTION

The present invention relates to a hand carried portable rail saw and in particular to such a saw which is arranged to be axially moved, once clamped to the rail, to the precise location of the cut.

Another purpose is a rail saw of the type described which is pivotally mounted to a rail clamp so that the saw may be swung from one side of the rail to the other.

Another purpose is a rail saw having a hardened saw guide which is used to maintain the saw in the proper disposition relative to the rail during the cutting operation.

Another purpose is a portable rail saw assembly of the type described in which the saw is telescopically mounted to the clamp for pivotal movement to both sides of the rail to be cut.

Other purposes will appear in the ensuing specification, drawings and claims.

BRIEF DESCRIPTION OF THE DRAWINGS

The invention is illustrated diagrammatically in the following drawings wherein:

FIG. 1 is a perspective view of the rail saw assembly,

FIG. 2 is an end view of the rail clamp with the saw removed, as viewed from the opposite side in FIG. 1, and with parts broken away, FIG. 3 is a section along plane 3—3 of FIG. 2, and FIG. 4 is a plan view of the pivotal attachment for the saw with parts in section.

DESCRIPTION OF THE PREFERRED EMBODIMENT

The present invention provides a rail saw having a blade or cut-off wheel which may typically be formed of an abrasive material which grooves the rail. The saw first forms a groove on one side of the rail and is then indexed over to the opposite side where it forms a similar groove, the end result being a complete, even, smooth cut through the rail. The saw is totally portable and may be hand carried to the lcation where the cut is to be made. The saw is clamped to the rail, adjusted to the exact location of the cut and then the cutting operation takes place.

In the drawing the saw itself is indicated generally at 10 and may conventionally be a standard commercial saw having a rotating blade or cut-off wheel 12. The saw is powered by a gasoline engine 14 and may have a conventional hand starter 16. The saw 10 includes a front handle 18 and a rear handle and trigger 20. A saw guard is indicated at 22 and the guard may conventionally enclose a belt or chain which drives blade 12.

The rail to be cut is diagrammatically indicated at 26 and the entire saw assembly will be positioned as close as possible to the exact area of the cut. A clamp assembly is indicated generally at 28 and includes a base plate 30 having spaced downwardly extending clamp members 32 on opposite ends thereof. The inner surface of clamp members 32 has an inwardly-extending projection or hook 34 formed to fit under the rail head. A movable clamp member 36 is pivotally attached to base 30, as at 38, and has an end portion 39 adapted to fit under the rail head when the clamp is fully attached. A threaded rod 40 is mounted in a generally upright support 42 fixed to clamp base 30, with one end of rod 40 having a hand grip 44. The opposite end of rod 40 is pivotally attached to movable clamp member 36, with the result that rotation of rod 40 will cause clamp member 36 to pivot about its base plate attachment 38 and into position to clamp the rail head as particularly illustrated in FIG. 2.

A pair of spaced upstanding supports 46 are mounted on clamp base plate 30 and through bushings 47 movably mount a sleeve 48 adjacent their upper ends. A threaded rod 50 is threaded into one end of sleeve 48 and is supported on slide base plate 30 by an upstanding support 52. A knob 54 is attached to rod 50 so that it may be rotated. Rod 50 is fixed against axial movement, by means of support 52, which extends into notch 53 in knob 54, but is permitted to rotate with rotation of the rod causing axial movement of sleeve 48. A lock nut 56 is threadedly mounted on rod 50 and will conventionally be loosened prior to axial movement of sleeve 48 and then will be rotated into firm engagement with the sleeve once the sleeve and saw have been adjusted to the appropriate position.

Sleeve 48 forms a part of the axial locater for the entire rail saw assembly. Pivotally attached to one end of sleeve 48 is a generally rectangular shaped elongated member 58. Telescoped within elongated member 58 is a second elongated generally rectangular shaped member 60. The outer end of member 60 pivotally mounts a cylindrical support 62 which in turn is pivotally attached to a saw support sleeve 64.

Sleeve 64 includes an inner cylindrical member 66, one end of which is attached to a saw bracket 68 which in turn is mounted by bolts 70 to the saw 10. A triangular-shaped web 72 is welded to sleeve 64 and support 62 to reinforce the connection therebetween.

Cylindrical member 66 which is rotatable within sleeve 64 has a notched detent member 74 at one end thereof, with member 74 having diammetrically opposed notches 76 to provide index positions 180° apart. A small piston 78 is mounted within a bore 80 in the shaft carried by support 62 and is urged outwardly by a coil spring 82. Piston 70 has a bullet-shaped end 84 which is biased by spring 82 into notches 76 to thus hold the saw in a particular detented position relative to support 62 and telescopic member 60.

The telescoping inner member 60 may have a series of openings 86 along one edge thereof, as particularly shown in the cut-away portion of FIG. 2. A spring-biased lock 88 is attached to the top of outer telescoping member 58 and has a locking member which can be released by a ring 90. Thus, the relative position of the two telescoping saw members can be releasably adjusted.

At one end of the clamp base plate 30 is a semi-cylindrical hardened saw guide 92 having an end surface 94 which will support saw blade 12 during the cutting operation. Hanging downwardly from plate 30 is a saw support 96 which is pivotally attached to the plate by brackets 98 and a pin 100. Support 96 has an outwardly-extending pin 102 which can be used to support the telescoping members and thus the saw during the cutting operation.

In use, the entire assembly is positioned on top of the rail and is moved until end surface 94 of saw guide 92 is in approximate alignment with the cutting location. Clamping rod 40 is turned causing clamp member 36 to pivot to a position beneath the rail head, thus securing plate 30 to the rail. Lock nut 56 is loosened and knob 54 is rotated to adjust the position of the saw until it is directly adjacent the saw guide. Normally sleeve 48, the telescoping members 58 and 60, and thus the entire saw assembly, will only have to be moved a fraction of an inch or so to make the appropriate adjustment. After the position of the saw has been set, lock nut 56 is turned tight so that there can be no further axial movement of the saw and its supporting sleeve 48. During this initial adjustment support 96 may be pivoted to a position where it extends upwardly to support telescoping members 58 and 60 and the saw.

The saw is started and the relative telescopic position of members 58 and 60 is adjusted for making the cut. The cutting operation begins with the saw above the rail and the saw moves downwardly until the blade passes through the bottom web of the rail. Because of the size of the saw, only half of the rail will be cut. At this point the saw is pulled back away from the rail and is moved upwardly to a position directly above the rail. The saw is pivoted, causing cylindrical member 66 to rotate within sleeve 64 until the saw has been turned through 180°. Note the diammetrically opposed notches 76 which provide for the two indexed positions of the saw relative to its support. The saw can now be lowered and the opposite half of the rail cut.

During the cutting operation blade 12 is positioned directly against the hardened surface 94 of saw guide 92. Since abrasive cut-off wheels of the type generally used in a saw of this construction are somewhat flexible, the saw guide prevents flexing of the blade when pressure is applied to it and also prevents any wobble of the blade during the cutting operation. Thus, a clean, smooth cut is provided using the saw guide as a means for maintaining blade alignment.

The sawing operation is essentially free-hand. Since the engine driving the saw has limited power, it is necessary to "feel" blade penetration to prevent overloading and stalling of the engine. The saw guide provides sufficient alignment to maintain the blade in the proper plane while allowing the operator to control the blade and engine dynamics as he desires.

Whereas the preferred form of the invention has been shown and described herein, it should be realized that there may be many modifications, substitutions and alterations thereto.

The embodiments of the invention in which an exclusive property or privilege is claimed are defined as follows:

1. A portable rail saw assembly including saw means having a rotatable blade, a clamp adapted to attach to a rail to be cut, an axial locater movably mounted on said clamp, means pivotally attaching said saw means to said axial locater, means for moving said axial locater and saw means in a direction generally parallel to the rails and relative to the clamp for positioning said saw means for cutting a rail, means permitting movement of said saw means toward and away from said axial locater and clamp and providing for swing-over movement of said saw means from one side of the rail to be cut to the opposite side including a pair of telescopic members, one of said telescopic members being pivotally connected to said saw means and the other being pivotally connected to said axial locater, the pivotal connection between said one telescopic member and said saw means providing for movement of said saw means about perpendicular axes whereby said saw means is capable of being positioned in an upright operating position on both sides of a rail to be cut, and detent means for holding said saw means in said upright positions on both sides of the rail.

2. The structure of claim 1 further characterized in that the telescoping members include an outer generally rectangular member pivotally attached to said axial locater and an inner generally rectangular member pivotally attached to said saw means.

3. The structure of claim 1 further characterized by and including a saw guide fixed to said clamp, said saw means blade being positioned adjacent said saw guide during a rail cutting operation.

4. The structure of claim 3 further characterized in that said saw guide is generally semi-cylindrical in configuration and is located directly above the rail to be cut.

5. The structure of claim 1 further characterized in that said axial locater includes support means fixed to said clamp, an axially movable tube journaled in said support means, said saw means being pivotally attached to one end of said axially movable tube, and means for moving said tube.

6. The structure of claim 5 further characterized in that the means for moving said tube includes a threaded rod extending within said tube and in threaded engagement therewith, said threaded rod being fixed in axial position relative to said clamp such that rotation of said rod causes axial movement of said tube.

* * * * *